UNITED STATES PATENT OFFICE.

JOHN H. PALMER, OF WEST NEW BRIGHTON, NEW YORK.

PAINT.

SPECIFICATION forming part of Reissued Letters Patent No. 11,255, dated July 26, 1892.

Original No. 350,765, dated October 12, 1886. Application for reissue filed October 18, 1887. Serial No. 252,763.

*To all whom it may concern:*

Be it known that I, JOHN HENRY PALMER, of West New Brighton, in the county of Richmond and State of New York, have invented a new and Improved Paint, of which the following is a full, clear, and exact description.

Prior to my invention the matter remaining after the usual process employed for purifying the oil extracted from flaxseed—that is, linseed-oil—by subjecting such oil to forced filtration in a filter-press has been of little or no value, as this matter or residuum was considered as so much waste material; but I have discovered that by combining this residuum with a certain amount of linseed-oil an excellent and durable paint (or, more exactly, a paint-body) may be produced.

My composition consists of the following ingredients, which may be combined in the proportions stated: Residuum of linseed-oil, three parts, by bulk; linseed-oil, one part. These ingredients are to be thoroughly mixed according to any method commonly used for mixing paints, such as by grinding in a paint-mill. These proportions are suitable for what is known as "paste-paint." This paint may be applied as any ordinary form of paint is applied, being thinned with turpentine to the proper consistency for working with a brush. Without a pigment it may be used as a primer.

For the further information of the public I will state that I have found it preferable to melt the said residuum of linseed-oil by a gentle heat and then to strain it in order to remove foreign particles; also, for ordinary house-painting I have found the following proportions the most satisfactory, namely: residuum of linseed-oil, one part, by bulk; pigment ground in oil, one part, by bulk; linseed-oil or turpentine, about four to six parts, by bulk, or enough to thin the paint to the proper consistency for working.

I expressly disclaim the use as a paint ingredient of the residuum resulting from the old process of purifying linseed-oil (usually boiled oil) by precipitation, as I am well aware that this residuum, which is known as "linseed-oil foots," has long been known and used as an ingredient for paints. The residuum which I use is the waxy cake which comes out of the filter-presses through which linseed-oil, and more especially boiled oil, or the said "foots," has been forced in order to purify or clarify it.

Having thus described my invention, what I claim as new, and desire to secure by Letters Patent, is—

1. The herein-described composition of matter constituting a paint, consisting of the residuum of linseed-oil resulting from the purification of such oil by forced filtration, combined with linseed-oil, substantially as specified.

2. The herein-described composition of matter constituting a paint, consisting of the residuum of linseed-oil resulting from the purification of such oil by forced filtration, combined with linseed-oil, in proportions substantially as specified.

JOHN H. PALMER.

Witnesses:
JNO. E. GAVIN,
CHAS. M. HIGGINS.